United States Patent [19]

Greggain et al.

[11] Patent Number: 5,559,905
[45] Date of Patent: Sep. 24, 1996

[54] DIGITAL IMAGE RESIZING APPARATUS

[75] Inventors: Lance Greggain, Woodbridge; Peter Mandl, Aurora; Bruce Intihar, Willowdale, all of Canada

[73] Assignee: Genesis Microchip Inc., Markham, Canada

[21] Appl. No.: 125,530

[22] Filed: Sep. 22, 1993

[51] Int. Cl.⁶ ........................................ G06K 9/32
[52] U.S. Cl. .................... 382/298; 382/199; 364/724.01
[58] Field of Search ............................ 382/47, 22, 41, 382/298, 199, 276; 364/724.01, 724.05, 724.08, 724.1, 724.11, 724.16; 395/102, 139; 398/240, 230, 505, 510, 522–524

[56] References Cited

U.S. PATENT DOCUMENTS

| | | | |
|---|---|---|---|
| 4,551,753 | 11/1985 | Nishizawa et al. | 358/140 |
| 4,674,125 | 6/1987 | Carlson et al. | 382/49 |
| 4,682,301 | 7/1987 | Horiba et al. | 364/724.05 |
| 4,779,217 | 10/1988 | Takeda et al. | 364/724.16 |
| 4,797,942 | 1/1989 | Burt et al. | 382/41 |
| 4,821,223 | 4/1989 | David | 364/724.05 |
| 4,845,758 | 7/1989 | Op de Beek et al. | 381/98 |
| 5,125,042 | 1/1992 | Kerr et al. | 382/47 |
| 5,280,546 | 1/1994 | Machida et al. | 382/47 |
| 5,299,029 | 3/1994 | Moriya et al. | 382/47 |
| 5,355,328 | 10/1994 | Arbeiter et al. | 364/724.1 |

OTHER PUBLICATIONS

Wolfberg, George, "Digital Image Warping", IEEE Computer Society Press 1988.

Lim, J. S. "Two Dimensional Signal and Image Processing", Prentice Hall, 1990.

Elliot, D. F., "Handbook of Digital Signal Processing", Academic Press 1987.

*Primary Examiner*—Joseph Mancuso
*Assistant Examiner*—Bipin Shalwala
*Attorney, Agent, or Firm*—Ron Fish; Falk, Vestal & Fish

[57] ABSTRACT

In an apparatus for resizing an image, comprising interpolation filter means for receiving a stream of input pixels having a predetermined sampling period P and a first sampling rate of S pixels/lines, and interpolating the stream of input pixels at a predetermined interpolation rate for generating a first derived sample stream of pixels having a further sampling period $(M/(CL))P$ and a second sampling rate of T pixels/lines, where L is a first positive integer greater than one, C is a positive integer and M is smaller than CL, and where either $2^n M/CL$ or $2^{-n} M/CL$ is equal to time step increment $M/L$ and the absolute value of n is at least equal to zero, and octave filtering means having a predetermined sampling rate which is related to the interpolation rate of the interpolation filter, for receiving the first derived sample stream of pixels and in response generating a stream of filtered output pixels having a sample period of $(M/L)P$, the improvement comprising means within the interpolation filter means for aligning the stream of input pixels and the first derived stream of sampled pixels at the boundaries of the image.

16 Claims, 2 Drawing Sheets

DIGITAL IMAGE RESIZING APPARATUS

FIELD OF THE INVENTION

The invention relates in general to digital signal processing of images and specifically to a novel digital image resizing apparatus.

BACKGROUND OF THE INVENTION

For the purpose of the following description, the term "image" will be understood to mean a two dimensional representation that can be sampled digitally and represented by a frame or field containing lines of pixels, where each pixel represents one picture element. The size of an image represented by the number of pixels per line and the number of lines per frame or field may be changed by digital signal processing, without changing the information content of the image.

According to the prior art, various forms of digital signal processing of images are known, such as disclosed in U.S. Pat. Nos. 4,674,125 and 4,797,942. It is well known in the art to generate images which have been filtered, resized, projected, warped, etc. (see Digital Image Warping, George Wolberg, IEEE Computer Society Press 1988; Two-dimensional Signal and Image Processing, Jae S. Lim, Prentice Hall 1990; Handbook of Digital Signal Processing, Douglas F. Elliott, Academic Press 1987).

It is also well known that digital image processors, such as filters, can be implemented via integrated circuits. These circuits are limited in the sizes of images that can be processed thereby within a given time frame because of maximum clock rates and by the sizes of the elements used to provide line delays in such circuits. Software implementations are similarly limited by the maximum throughput of the CPU that is used to run the software.

U.S. patent application Ser. No. 07/766,128 abandoned, continuation-in-part application No. 08/033,503 filed Mar. 18, 1993, now issued to U.S. Pat. No. 5,355,328) describes, in general terms, an apparatus for providing an image resizing function. The first element in the apparatus disclosed in application Ser. No. 07/766,128 is an interpolator for changing the number of samples of an input sample stream having a given sampling period P by a factor of M/CL, where C is a positive integer and M is smaller than CL, and where either $2^nM/CL$ or $2^{-n}M/CL$ is equal to the time increment M/L and the absolute value of n is at least equal to zero, so that the sampling period of the first derived sample stream is (M/(CL))P.

The second element in the apparatus disclosed in application Ser. No. 07/766,128 is an octave filtering means having a predetermined sampling rate which is related to the interpolation rate of the first element so that the output of the second element has a sample period of (M/L) P.

SUMMARY OF THE INVENTION

The present invention relates to a specific implementation of the functions described in U.S. patent application Ser. No. 07/766,128 in an improved image resizing apparatus.

While the system of U.S. patent application Ser. No. 07/766,128 provides a radical improvement in prior art resampling, the present invention provides a specific implementation which is characterized by improved performance characteristics. These enhanced performance characteristics are effected as a result of numerous design features of the present invention, such as those relating to the handling of edge conditions, the ability to process single images in multiple segments, the precision of the arithmetic that is used in the octave filter means and in the handling of high resize factors with a fixed order filter.

According to one aspect of the present invention, two novel octave filters are provided. In one, the first octave is filtered using a 5 tap finite impulse response ('FIR') filter, the second octave is filtered using a 9 tap FIR filter, the third octave is filtered using a 17 tap FIR filter, the fourth octave is filtered using a 33 tap FIR filter, the fifth octave is filtered using a 65 tap FIR filter, and all higher octaves are filtered using a 65 tap FIR filter. In the second case the first octave is filtered using a 3 tap finite impulse response ('FIR') filter, the second octave is filtered using a 5 tap FIR filter, the third octave is filtered using a 9 tap FIR filter, the fourth octave is filtered using a 17 tap FIR filter, the fifth octave is filtered using a 33 tap FIR filter and all higher octaves are filtered using a 33 tap FIR filter. In both of the above mentioned octave filter implementations, the filter coefficients are chosen in such a manner as to keep the same damping factor or "Q" factor. This allows for a smooth and continuous resizing operation.

The precision of the arithmetic used in the FIR filters of the present invention is improved using a system of coefficient truncation or rounding, for reducing the number of bits required to represent the coefficients, and subsequently sign extending and shifting intermediate product values resulting from multiplication of the coefficients for restoring arithmetic significance to the values.

The pseudo-floating point filter coefficients are multiplied by the input data at reduced precision and the results are shifted and sign extended to compensate for the bit truncation. This reduces the quantity of data stored where the coefficients are stored in memory, and reduces the complexity of the arithmetic required to obtain the exact result. It is contemplated that the filter coefficients may be hard wired (fixed coefficients that are connected to logic high or logic low voltages on a bit-by-bit basis), stored in RAM or ROM, loaded from a host, or calculated.

The boundary conditions and edge effects of the images are moderated in the present invention by mirroring the edge pixels and lines in a novel manner.

All of the above discussed features of the invention are described in greater detail below.

BRIEF DESCRIPTION OF THE DRAWINGS

A detailed description of the prior art and of the preferred embodiment is provided herein below, with reference to the drawings, in which.

DESCRIPTION OF PREFERRED EMBODIMENT

Figure 1:
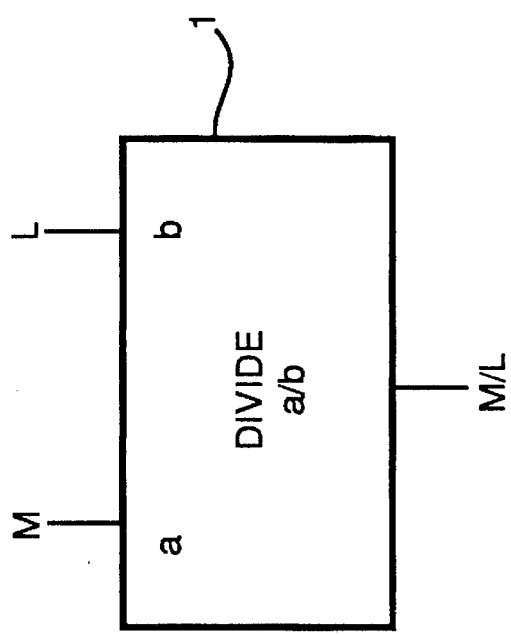
FIG. 1 is a block diagram of a prior art system for calculating the time increment M/L.

As discussed above, U.S. patent application Ser. No. 07/766,128 discloses resampling by the ratio or time increment M/L by first interpolating by the ratio of $2^nM/L$. One prior art system to calculate the ratio of the output samples M to input samples L, is shown in FIG. 1.

According to this prior art technique, the time step or increment is calculated as follows:

The source value L pixels per line and the target value M pixels per line are applied to the "a" and "b" inputs, respectively, of a divider 1 which calculates the resampling time step increment M/L=a/b. At line 37, delete "(T−1)." and substitute —(T−1). The values S and T represent the source value of input pixels per line and the target value output pixels per line as explained further below with reference to FIG. 2.

Thus, for a remapping from four source pixels/lines to five target pixel/lines, M/L=⅘=0.8. However, the last resampled pixel on each line will not be aligned with the last input pixel on the input grid.

In accordance with the present invention, means are provided for recalculating the time step increment M/L to provide spatial alignment of interpolated pixels with the input grid, as follows:

$$M/L=(S-1)/(T-1)$$

Figure 2:
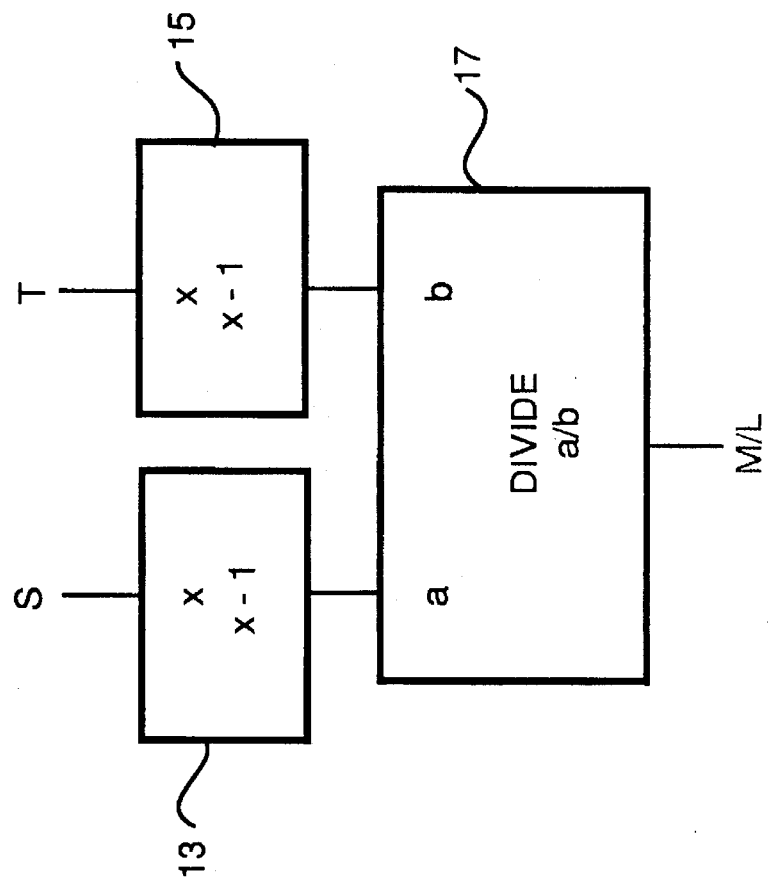
FIG. 2 is a block diagram of a system according to one aspect of the present invention for calculating the time increment M/L.

With reference to FIG. 2, a circuit is shown for generating the time step increment M/L. The source value S of input pixels/lines is applied to an input (X) of a first subtracter 13 for subtracting "1" from the input, yielding S−1. Likewise, the target value of output pixels/lines is applied to the input (X) of a second subtracter 15 for subtracting "1" from the input, yielding T−1. The digital outputs of subtractors 13 and 15 are applied to "a" and "b" inputs, respectively, of a divider 17 which yields an output of a/b=(S−1)/(T−1)=M/L.

According to the circuit of FIG. 2, the interpolated output pixels at the image boundaries are aligned with the input pixels at the image boundary. Thus, for the example discussed above, M/L=(4−1)/(5−1)=¾=0.75.

As an alternative to the use of the subtractors 13 and 15, loadable down counters may be used in which the loaded input values are clocked downwardly by "1" after being loaded. Furthermore, as an alternative to the hardware embodiment of FIG. 2, the calculation of M/L may also be conveniently effected in a computer executing appropriate software.

It is well known that calculating $2^n$M/L once M/L is known is a simple matter of shifting M/L one binary place to the left for each power of 2. Thus, for the system of U.S. patent application Ser. No. 07/766,128, when n=1, M/L is shifted one binary place to the left, when n=2 M/L is shifted 2 binary places to the left, etc. When n=−1, M/L is shifted one binary place to the right.

The apparatus of FIG. 2 provides two significant improvements over the prior art resizing apparatus disclosed in U.S. patent application Ser. No. 07/766,128. Edge conditions can be handled easily by mirroring the pixels at the image boundaries, and processing of an image in multiple segments is facilitated, as described in Applicant's copending patent application number 08/126,388, filed on Sep. 4, 1993, and entitled Image Mirroring and Image Extension for Digital Filtering, the disclosure of which is incorporated herein by reference.

According to a further aspect of the present invention as described briefly above, the implementation of the FIR octave filters in the resizing system of U.S. patent application Ser. No. 07/766,128 has been effected with advanced arithmetic to improve the precision and quality of the filters, as discussed in greater detail below.

Figure 3:
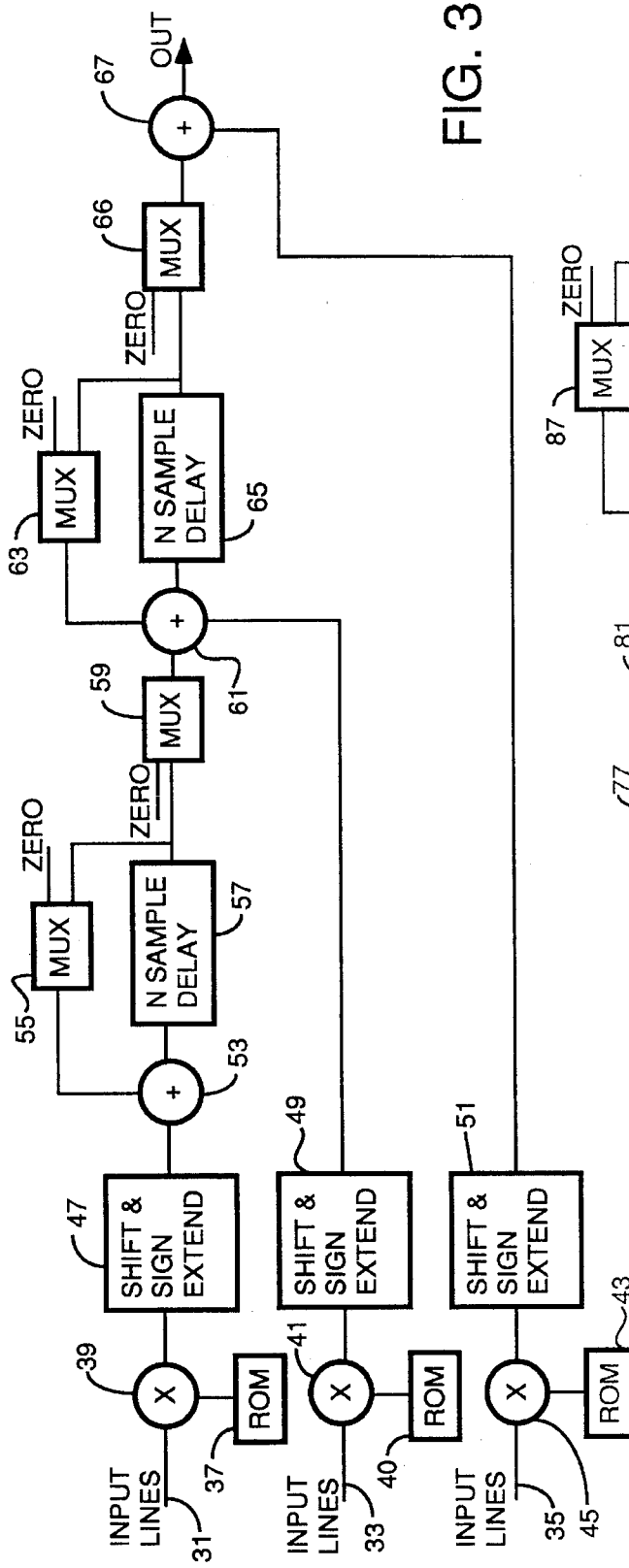
FIG. 3 is a block diagram of an octave filter according to one embodiment of a further aspect of the present invention.

FIG. 3 illustrates an octave FIR filter circuit according to one embodiment of this aspect of the present invention, by which the improved precision is implemented. For the illustrated configuration, five filters are included. The filter coefficients are contained in Table 1, which is discussed in greater detail below.

According to the present invention, numerical precision in a digital filter is improved by truncating or rounding the multiplier coefficients prior to multiplication and shifting the resultant multiplier product values and utilizing sign extension for restoring significance of the product values. According to the present invention, the coefficients are represented as 2's complement numbers, with positive integers being represented in the usual fashion as unsigned binary integers. However, according to the present invention, only the most significant bits of the coefficients are applied to the digital filter multipliers (e.g. multipliers 39, 41 and 45 in the filter illustrated in FIG. 3). More particularly, leading 0's are deleted and trailing 0's are ignored for positive numbers. The leading 1's are deleted for 2's complement negative numbers and the trailing 0's are ignored. Finally, the multiplier results are shifted and sign extended in order to restore the significance of the product values being produced.

For a unity gain digital filter, the sum of the coefficients is 1. Thus, for filters with large numbers of taps, the coefficients are smaller than for filters with smaller numbers of taps, in order that the sum of the filter coefficients is 1. Regardless of the gain of the filter, the technique of the present invention is applicable except that the sum of the coefficients may differ from 1.

Table 1 illustrates the truncated or rounded filter coefficients for 5 tap, 9 tap, 17 tap, 33 tap and 65 tap Gaussian low pass filters. As can be seen from Table 1, for wide filters the leading bits in the positive coefficients are always 0 and the leading bits in the negative coefficients are always 1. By way of contrast, the trailing bits in the coefficients for narrow filters are all 0.

In the example shown in Table 1, six digits have been selected containing the greatest amount of data (i.e. "1" to "0" transitions) for a 6 bit multiplier. In the case of a 5 tap filter, the additional trailing 0's in the six-bit integer can also be discarded. However, for a multiplier with 6 bit resolution there is no benefit in doing so.

Thus, according to the principles of the present invention, the precision of the filter coefficients may be extended for a given size multiplier. In the examples of Table 1, the trailing 0's are discarded where they exceed the precision in the 5 tap case. In the 17 tap, 33 tap and 65 tap cases there are no trailing 0's to be discarded.

TABLE 1

| Coefficient | Filter Coefficients | | | Shift Applied to Result |
|---|---|---|---|---|
| | 9 Bit 2's Complement Representation | 0 Integer 1 2's Comp | 6 bit Integer or 2's Complement Filter Coefficient | |
| 5 Tap Decimating | | | Trailing 0's Truncated | |
| Half Band Filter | | | | |
| h(0) | 01011100000 | 0 | 101000 | 1R |
| h(1), h(−1) | 001000000 | 1 | 010000 | 1R |
| h(2), h(−2) | 111110000 | 1 | 111100 | 1R |
| 9 Tap Decimating Quarter Band Filter | | | | |
| h(0) | 001001110 | 0 | 100111 | 2R |
| h(1), h(−1) | 000111111 | 0 | 111111 | 3R |
| h(2), h(−2) | 000011110 | 1 | 011110 | 3R |
| h(3), h(−3) | 000000011 | 1 | 000011 | 3R |
| h(4), h(−4) | 111111001 | 1 | 111001 | 3R |
| 17 Tap Decimating 1/8 | | | Leading 0's or 1's Truncated | |
| th band Filter | | | | |
| h(0) | 000100110 | 0 | 100110 | 3R |
| h(1), h(−1) | 000100101 | 0 | 100101 | 3R |
| h(2), h(−2) | 000011111 | 1 | 011111 | 3R |
| h(3), h(−3) | 000010111 | 1 | 010111 | 3R |
| h(4), h(−4) | 000001111 | 1 | 001111 | 3R |
| h(5), h(−5) | 000000111 | 1 | 000111 | 3R |
| h(6), h(−6) | 000000001 | 1 | 000001 | 3R |
| h(7), h(−7) | 111111110 | 1 | 111110 | 3R |
| h(8), h(−8) | 111111101 | 1 | 111101 | 3R |
| 33 Tap Decimating 1/16th Band Filter | | | | |
| h(0) | 000010010 | 1 | 010010 | 3R |
| h(1), h(−1) | 000011000 | 1 | 011000 | 3R |
| h(2), h(−2) | 000010001 | 1 | 010001 | 3R |
| h(3), h(−3) | 000010000 | 1 | 010000 | 3R |
| h(4), h(−4) | 000001111 | 1 | 001111 | 3R |
| h(5), h(−5) | 000001101 | 1 | 001101 | 3R |
| h(6), h(−6) | 000001011 | 1 | 001011 | 3R |
| h(7), h(−7) | 000001001 | 1 | 001001 | 3R |
| h(8), h(−8) | 000000111 | 1 | 000111 | 3R |
| h(9), h(−9) | 000000101 | 1 | 000101 | 3R |
| h(10), h(−10) | 000000011 | 1 | 000011 | 3R |
| h(11), h(−11) | 000000010 | 1 | 000010 | 3R |
| h(12), h(−12) | 000000000 | 1 | 000000 | 3R |
| h(13), h(−13) | 000000000 | 1 | 000000 | 3R |
| h(14), h(−14) | 111111111 | 1 | 111111 | 3R |
| h(15), h(−15) | 111111111 | 1 | 111111 | 3R |
| h(16), h(−16) | 111111111 | 1 | 111111 | 3R |
| 65 Tap Decimating 1/32nd Band Filter | | | | |
| h(0) | 000001010 | 1 | 001010 | 3R |
| h(1), h(−1) | 000010000 | 1 | 010000 | 3R |
| h(2), h(−2) | 000001001 | 1 | 001001 | 3R |
| h(3), h(−3) | 000001001 | 1 | 001001 | 3R |
| h(4), h(−4) | 000001000 | 1 | 001000 | 3R |
| h(5), h(−5) | 000001000 | 1 | 001000 | 3R |
| h(6), h(−6) | 000001000 | 1 | 001000 | 3R |
| h(7), h(−7) | 000001000 | 1 | 001000 | 3R |
| h(8), h(−8) | 000000111 | 1 | 000111 | 3R |
| h(9), h(−9) | 000000111 | 1 | 000111 | 3R |
| h(10), h(−10) | 000000110 | 1 | 000110 | 3R |
| h(11), h(−11) | 000000110 | 1 | 000110 | 3R |
| h(12), h(−12) | 000000101 | 1 | 000101 | 3R |
| h(13), h(−13) | 000000101 | 1 | 000101 | 3R |
| h(14), h(−14) | 000000100 | 1 | 000100 | 3R |
| h(15), h(−15) | 000000100 | 1 | 000100 | 3R |

TABLE 1-continued

| | Filter Coefficients | | | |
|---|---|---|---|---|
| Coefficient | 9 Bit 2's Complement Representation | 0 Integer 1 2's Comp | 6 bit Integer or 2's Complement Filter Coefficient | Shift Applied to Result |
| h(16), h(−16) | 000000011 | 1 | 000011 | 3R |
| h(17), h(−17) | 000000011 | 1 | 000011 | 3R |
| h(18), h(−18) | 000000010 | 1 | 000010 | 3R |
| h(19), h(−19) | 000000010 | 1 | 000010 | 3R |
| h(20), h(−20) | 000000001 | 1 | 000001 | 3R |
| h(21), h(−21) | 000000001 | 1 | 000001 | 3R |
| h(22), h(−22) | 000000001 | 1 | 000001 | 3R |
| h(23), h(−23) | 000000000 | 1 | 000000 | 3R |
| h(24), h(−24) | 000000000 | 1 | 000000 | 3R |
| h(25), h(−25) | 000000000 | 1 | 000000 | 3R |
| h(26), h(−26) | 000000000 | 1 | 000000 | 3R |
| h(27), h(−27) | 000000000 | 1 | 000000 | 3R |
| h(28), h(−28) | 000000000 | 1 | 000000 | 3R |
| h(29), h(−29) | 000000000 | 1 | 000000 | 3R |
| h(30), h(−30) | 000000000 | 1 | 000000 | 3R |
| h(31), h(−31) | 000000000 | 1 | 000000 | 3R |
| h(32), h(−32) | 000000000 | 1 | 000000 | 3R |

The step of switching between a 2's complement and unsigned multiplier corresponds to shifting the significance of the generated product. The shift and sign extension step shown in relation to the 9 tap, 17 tap, 33 tap and 65 tap filters effectively restores the significance of the data after the multiplication has taken place.

In a case where the input data contains leading 0's (positive numbers) or leading 1's (negative numbers), the 6 most significant digits can be selected. Significance of the 2's complement product is restored by right shifting the results with sign extension. This technique utilizes the significance of the product to extend the effective precision of the input data.

It will be noted from Table 1 that changes between 2's complement and unsigned binary filter coefficients have been used only when a particular need has been identified. In particular, the significance of all of the filters has been maintained so that different filters can be selected without any changes to the average intensity of the filtered image that is produced. The 5, 9 and 17 tap filters use the change between 2's complement and unsigned binary numbers to improve the overall accuracy of the filters. All of the filters use the technique of truncating the filter coefficients to retain the significant digits and then shift with sign extension to restore the correct value after the multiplication is complete.

The filter coefficients are the same for both vertical and horizontal directions. The method described in Applicant's corresponding application no. 08/133,367, filed on Oct. 8, 1992 entitled Image Filtering With an Efficient Implementation of High Order Decimating Digital. Filters, is employed in the apparatus of the present invention to extend the use of the 65 tap filter for resize factors above the fifth octave. This technique has been applied both horizontally and vertically for the present invention.

A more detailed discussion of the circuit of FIG. 3, operating as a 5 tap decimating half band filter, will now be presented.

Input line 31 carries video signal sample values from successive input lines L1, L2 . . . L6, L7 . . . etc. which form the relatively long scan-line sampling periods in the vertical direction of a video image. Thus, L1, L2 . . . L7 and L8 represent eight successive relatively long horizontal scan lines of the video image (with each scan line comprising a large number of pixel sample values). Thus, starting with input line L1, multiplier 39 receives, in turn, as a multiplicand each of all the successive input lines L1, L2 . . . L6, L7 . . . of sample values, and receives as a multiplier one of the truncated 6-bit filter coefficients h(−2) or h(−1) from ROM 37 (see Table 1 of the truncated kernel function coefficients). Starting with input line L3, multiplier 41 receives, in turn, as a multiplicand each of the successive input lines L3, L4 . . . LB, L9 . . . of sample values, and receives as a multiplier one of the truncated 6-bit filter coefficients h(1) or h(0) from ROM 40. Starting with input line L5, multiplier 45 receives, in turn, as a multiplicand each of the successive odd-numbered input lines L5, L7, L9 . . . of sample values, and receives as a multiplier the truncated 6-bit filter coefficient h(2). In general, each of the successive input lines L1 . . . L9 . . . comprises N sample values, where N may be any positive integer. However, for illustrative purposes, it is assumed that each of these successive input lines is a scan line of a video image, occupying a scan-line period, and N is the number of pixel sample values in such a scan line.

As discussed above with reference to Table 1, the 14 bit output of multiplier 39 is shifted and sign extended to restore significance to the intermediate product integers output for multiplier 39 via shift and sign extend circuit 47.

The output of shift and sign extend circuit 47 is applied as a first input to summer 53 and the output of summer 53 is applied as an input to first N-sample delay circuit 57. The output of the first N-sample delay circuit 57 is applied both as a first input to multiplexer 55 and as a first input to multiplexer 59. A zero value is applied as a second input to both multiplexers 55 and 59. The output of multiplexer 55 is applied as a second input to summer 53 and the output of multiplexer 59 is applied as a first input to summer 61. The output from multiplier 41 is shift and sign extended via circuit 49 as discussed above, and the output of the shift and sign extend circuit 49 is applied as a second input to summer 61. The output of summer 61 is applied as an input to a second N-sample delay circuit 65. The output from the second N-sample delay circuit 65 is applied as a first input to multiplexer 63, and as a first input to an additional multiplexer 66.

A zero value is applied as a second input to each of multiplexers 63 and 66. The output from multiplexer 63 is applied as a third input to summer 61 and the output from multiplexer 66 is applied as a first input to summer 67. The output from multiplier 45 is shifted and sign extended via circuit 51, and the shifted and sign extended intermediate product signal output from circuit 51 is applied as a second input to summer 67. The output from summer 67 comprises the octave prefilter decimated output signal.

In addition to the structure shown in FIG. 3, each multiplier and summer includes an individual sample latch (not shown) at each of its inputs and at its outputs, with each latch introducing a one sample delay in the flow of data. Further, in practice, suitable timing and control circuitry (not shown) is provided for controlling the flow of data through the octave prefilter structure of FIG. 3 as discussed presently.

The settings of multiplexers 55 and 63 are such that the respective outputs of first and second N-sample delay circuits 57 and 65 are recirculated only during even input-line scan-line period cycles of operation and zero values are normally recirculated during all odd input-line scan-line period cycles of operation. (Although in principle, it is not absolutely essential that multiplexers 55 and 63 be in their zero value stage during those odd input-line scan-line period cycles of operation, such as during the initial cycle, where it is known a priori that no sample values can be emerging from the respective outputs of the first and second N-sample delay circuits 57 and 65.) The setting of multiplexers 59 and 66 is such that the outputs of N-sample delay circuits 57 and 65 are translated respectively therethrough to the inputs of summers 61 and 67 only during odd input-line scan-line period cycles of operation and zero values are translated therethrough to the first inputs of summers 61 and 67 during even input-line scan-line period cycles of operation.

For the purpose of the following discussion, corresponding sample values of the respective input lines L1, L2, L3 . . . are designated sL1, sL2, sL3 . . . , respectively. During the first scan-line period cycle of operation of the filter, each of the N samples of input line L1 is first multiplied by coefficient h(−2), to provide a sample value h(−2)s L1 and then each of these sample values is shifted and sign extended via circuit 47 to restore significance to the product signal and then applied through summer 53 as an input to the first N-sample delay means 57.

During the second scan-line period cycle of operation, multiplexer 55 is in its non-zero state, so that the sample values h(−2) sL1 now emerging as an output from the N-sample delay circuit 57 are recirculated back as a second input to summer 53 and are added to the corresponding h(−1) sL2 samples now being applied as a first input to summer 53 (ie ROM 37 generates the appropriate truncated 6-bit kernel-function weighting coefficient which is multiplied by the N samples of the second input line L2 in multiplier 39 and shifted and sign extended via circuit 47). Therefore, during the second scan-line period cycle of operation, the sample value of each sample applied as an input to the first N-sample delay circuit 57 is h(−2) sL1+ h(−1) sL2. However, during the second scan-line period cycle of operation, multiplexer 59 is in its zero state, so that the h(−2) sL1 value output from delay circuit 57 is not applied to the first input of summer 61.

During the third scan-line period cycle of operation, both multiplexers 55 and 63 are in their zero state, so that no recirculation takes place of the h(−2) sL1+h(−1) sL2 valued samples output from the first N-sample delay circuit 57 to the summer 53. However, multiplexer 59 is now in its non-zero state, so that the h(−2) sL1+h(−1) sL2 valued samples output from delay circuit 57 are forwarded through multiplexer 59 to the first input of summer 61. Thus, during the third scan-line period cycle of operation, h(−2) sL1+h(−1) sL2+h(0) sL3 valued samples are applied as an input to the second N-sample delay circuit 65 (i.e. ROM 40 generates the h(0) kernel function weighting coefficient in 6-bit truncated form, which is multiplied by the N-samples of input scan-line L3 via multiplier 41, the intermediate product signal output of which is shifted and sign extended via circuit 49 and applied to summer 61).

During the fourth scan-line period cycle of operation, both multiplexers 55 and 63 are in the non-zero state, so that recirculation takes place of the h(−2) sL1+h(−1) sL2+h(0) sL3 valued samples being output from the second N-sample delay circuit 65 back to the summer 61 as a second input thereto. Furthermore, ROM 40 generates the 6-bit truncated kernel function weighting coefficient h(1) for multiplication by the N-samples of input line L4 via multiplier 41. The intermediate product signal output from multiplier 41 is shifted and sign extended via circuit 49 and applied to summer 61 so that the output of summer 61 generates a summation of samples h(−2) sL1+h(−1) sL2+h(0) sL3+h(1) sL4. This summation of samples is now applied to the input of N-sample delay circuit 65. However, multiplexers 59 and 66 are now in the zero state, so that while the h(−2) sL3 valued samples now emerging from the output of the first N-sample circuit 57 are recirculated back to the second input of summer 53, these h(−2) sL3 valued samples are not forwarded to the first input of summer 61, and the h(−2) sL1+h(−1) sL2+h(0) sL3 valued samples now emerging as an output from second N-sample delay circuit 65 are not forwarded to the first input of summer 67. The recirculated h(−2) sL3 valued samples are now added to the h(−1) sL4 valued samples in summer 53 and the resulting h(−2) sL3+h(−1) sL4 valued samples are applied to the input of first N-sample delay circuit 57.

During the fifth scan-line period cycle of operation, both of multiplexers 55 and 63 are in their zero state, so that no recirculation takes place of the h(−2) sL3+h(−1) sL4 valued samples now emerging as an output from first N-sample delay circuit 57 back as a second input to summer 53. However, now multiplexers 59 and 66 are in the non-zero state, so that the h(−2) sL3+h(−1) sL4 valued samples are forwarded through multiplexer 59 to the first input of summer 61 and the h(−2) sL1+h(−1) sL2+h(0) sL3+h(1) sL4 valued samples now emerging from the second N-sample delay circuit 65 are applied to the first input of summer 67. Further, ROM 43 generates 6-bit truncated kernel-function weighting coefficient h(2) which is multiplied by the N-samples of scan-line L5 and multiplier 45, the intermediate product signal output of which is shifted and sign extended via circuit 51 and applied as a second input to summer 67, thereby deriving a first filtered output line comprising h(−2) sL1+h(−1) sL2+h(0) sL3+h(1) sL4 h(2) sL5 valued samples, from the first 5-tap octave prefilter structure of FIG. 3.

It will be noted that the status of the h(−2) sL3+h(−1) sL4 valued samples during the fifth scanline period cycle of operation is identical to the status of the h(−2) sL1+h(−1) sL2 valued samples during the third scan-line period cycle of operation. Thus, the sixth and seventh scan-line period cycles of operation will correspond, respectively, to the fourth and fifth scan-line period cycles of operation.

Therefore, the second filtered output line, comprising h(−2) sL3+h(−1) sL4+h(0) sL5+h(1) sL6 +h(2) sL7 valued samples, will be derived in the seventh scan-line period cycle of operation. In a similar manner, the third filtered output line comprising h(−2) sL5+h(−1) eL6+h(0) sL7+h(1) sL8 h(2) sL9 valued samples, will be derived in the ninth scan-line period cycle of operation while the fourth filtered output line, comprising h(−2) sL7+h(−1) sL8+h(0) sL9+h(1)

sL10+h(2) sL11 valued samples, will be derived in the eleventh scan-line period cycle of operation, and so forth.

From the above discussion, it can be seen that filtered output lines occur only for each successive odd scan-line period cycle of operation, starting with the fifth scan-line period cycle of operation. Therefore, decimation by a factor of two has taken place between the input and output lines of the first 5-tap octave prefilter structure of the present invention shown in FIG. 3.

The structure of FIG. 3 may be used to implement a 9 tap, 17 tap, 33 tap, 65 tap, etc. structure by applying the appropriate truncated kernel-function weighting coefficients from ROMs 37, 40 and 43 to multipliers 39, 41 and 45 in accordance with the appropriate timing control. The truncated intermediate product signals output from multipliers 39, 41 and 45 are shifted and sign extended via circuits 47, 49 and 51 in the manner discussed above.

As an example, implementation of the circuit of FIG. 3 as a 9-tap decimating filter is discussed herein below. ROM 37 operates cyclically to forward each of the four kernel-function weighting coefficients h(−4), h(−3), h(−2) and h(−1) from Table 1, in turn, to the multiplier input of multiplier 39. ROM 40 also operates cyclically to forward each of the four kernel-function weighting coefficients h(0), h(1), h(2), and h(3) from Table 1, in turn, to the multiplier input of multiplier 41. Further, ROM 43 generates the truncated kernel-function weighting coefficient h(4) and directly applies it to the input of multiplier 45.

Besides this difference in physical structure, there are the following differences in signal timing and control between that employed by the circuit of FIG. 3 for implementing a 5-tap filter and that employed when implementing a 9-tap filter. In the 9-tap filter implementation, starting with input line L5, every input line is applied to the multiplicand input of multiplier 41, and, starting with input line L9, every fourth input line (i.e. L13, L17 . . . ) is applied to the multiplicand input of multiplier 45. Further, the timing control of multiplexers 55 and 63 is such that they are in their zero state only during scan-line period cycles of operational 1, 5, 9, 13 . . . and are in their non-zero state during all other scanline period cycles of operation; while the timing control of multiplexers 59 and 66 is such that they are in the non-zero state only during scan-line period cycles of operation 1, 5, 9, 13 . . . and are in the zero state during other scan-line period cycles of operation.

In the operation of FIG. 3 for implementing a 9-tap decimating filter, the h(−4) sL1 valued samples are applied to the input of the first N-sample delay circuit 57 during the first scan-line period cycle of operation. During each of the second through fourth scan-line period cycles of operation, successive older recirculated sample values emerging as an output from the first N-sample delay circuit 57, that are applied to the second input of summer 53, are added to new sample values that are applied to the first input of summer 53 (in the manner described above in connection with the 5-tap decimating filter implementation of FIG. 3). This results in h(−4) sL1+h(−3) sL2+h(−2) sL3+h(−1) sL4 valued samples being applied to the input of first N-sample delay circuit 57 during the fourth scan-line period cycle of operation. However, when these h(−4) sL1+h(−3) sL2 +h(−2) sL3+h(−1) sL4 valued samples emerge as an output from the first N-sample delay circuit 57 during the fifth scan-line period cycle of operation, multiplexer 55 is in its zero state and multiplexer 59 is in its non-zero value state. Therefore, these h(−4) sL1+h(−3) sL2+h(−2) sL3+h(−1) sL4 valued samples are forwarded to the first input of summer 61, where they are added to h(0) sL5 valued samples applied to the second input of summer 61 before being applied as an input to second N-sample delay circuit 65.

During each of the scan-line period cycles of operation 6 to 8, in which successive older recirculated sample values emerging as an output from second N-sample delay means 65, that are applied to the third input of summer 61, are added to new sample values that are applied to the second input of summer 61 results in h(−4) sL1+h(−3) sL2+h(−2) sL3+h(−1) sL4+h(0) sL5+h(1) sL6+h(2) sL7+h(3) sL8 being applied to the input of second N-sample delay circuit 65 during the eighth scan-line period cycle of operation. However, when these samples emerge as an output from the second N-sample delay circuit 65 during the ninth scan-line period cycle of operation, multiplexers 59 and 66 are in the non-zero value state. Therefore, these sample values are forwarded to the first input of summer 67, where they are added to the h(4) sL9 valued samples that are applied to the second input of summer 67. This results in the value of samples from the output of summer 67, which constitutes a first filtered output pixel line, being h(−4) sL1+h(−3) sL2+ h(−2) sL3+h(−1) sL4+h(0) sL5+h(1) sL6+h(2) sL7+h(3) sL8+h(4) sL9.

In a similar manner, the value of samples constituting the second filtered output line is h(−4) sL5+h(−3) sL6+h(−2) sL7+h(−1) sL8+h(0) sL9+h(1) sL10+h(2) sL11+h(3) sL12+h(4) sL13; and so forth.

From the above discussion, it is clear that filtered output lines occur only for each successive fourth scan-line period cycle of operation, starting with the ninth scan-line period cycle of operation. Therefore, decimation by a factor of four has taken place between the input and output lines of the 9-tap octave prefilter structure implementation of FIG. 3.

The resizing apparatus described in U.S. patent application Ser. No. 07/766,128 requires that different filters be applied for each octave for image reduction or magnification. When these filters are changed at the boundaries of the reduction or magnification, there is potentially an undesirable visible difference between the image that is filtered with one octave prefilter and the image that is filtered by the next octave prefilter. The circuit of the present invention includes the use of 5 octave filters that all have the same archetype. This is sometimes referred to as the "Q" of a filter or the damping factor ("Filter Theory and Design: Active and Passive" by Adel S. Sedra and Peter O. Bracket, Matrix Publishers 1978).

As discussed above, the octave filters implemented in FIG. 3 can be designed by first designing the half band filter and over-sampling the impulse response of the half band filter to achieve the higher reduction filters. For example the 5 tap half band filter described in Table 1 has a frequency response expressed in decimal $H(w)=h(0) +2(h(1))\cos(wt)+ 2(h(2))\cos(2wt)=0.625+0.5\cos(wt) -0.125\cos(2wt)$. The impulse response of the filter, $h(t)$, may be calculated using any of a number of commercially available software packages. The FIR filter taps of the filter are equal to the corresponding values of the impulse response of the filter, (i.e. $h(0)=0.625$; $h(1)=0.25$; $h(2)=0.0625$). If the impulse response is evaluated at $t=0, 0.5, 1.0, 1.5$ and $2.0$, and used as the filter coefficients for a 9 tap quarter band FIR filter, the filter will have the same archetype as the half band filter. These coefficients are $0.65, 0.525, 0.25, 0.025, -0.0625$. The filter coefficients need to be normalized so that the gain of the filter is equal to 1. The normalised coefficients are $0.304688, 0.246094, 0.117188, 0.011719, -0.023744$. These are the filter coefficients given in Table 1 in binary form. The conversion to integer binary form requires a well known adjustment for integer arithmetic. For the eighth band filter, the impulse response needs to be evaluated at t=0, 0.25, 0.75, 1.0, 1.25, 1.5, 1.75, 2.0 and must be normalised.

Figure 4:
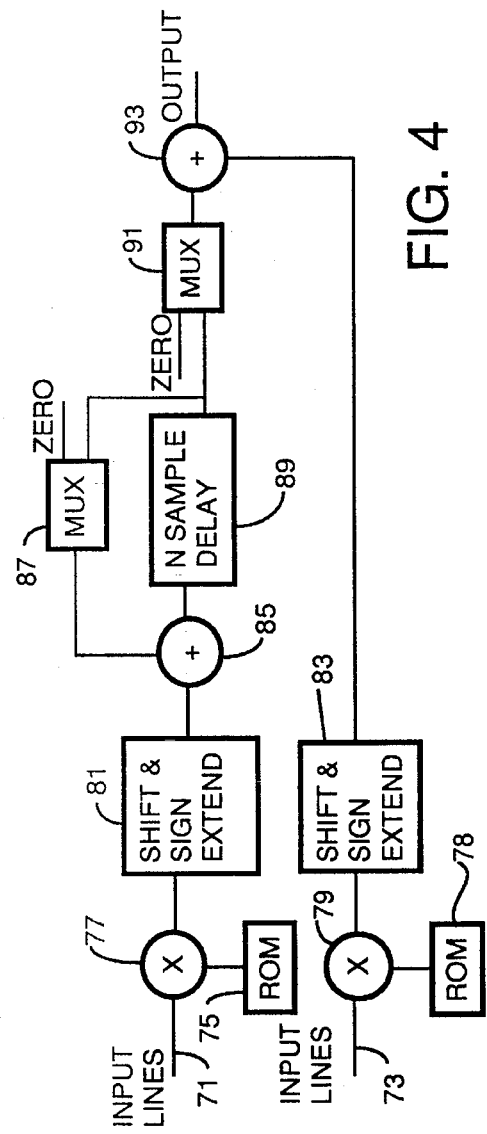
FIG. 4 is a block diagram of an octave filter according to an alternative embodiment of the aforementioned further aspect of the present invention.

The original apparatus described by Arbeiter and Bessler in U.S. patent application Ser. No. 07/766,128 is implemented as a 5 tap filter. The filter means of Applicant's alternative embodiment shown in FIG. 4 is unique in that it is a 3 tap filter. It is believed that a person skilled in the art would not expect that a 3 tap filter could be used in a high quality video processing architecture. However, the use of a 3 tap half band filter on the upsampled signal that is produced by the interpolation means produces a much higher quality output than would normally be expected. The filter coefficients that are contained in Table 2 describe the filters that are used with this second filter means. The first octave is filtered using a 3 tap finite impulse response (FIR) filter and the second octave is filtered using a 5 tap FIR filter and the third octave is filtered using a 9 tap FIR filter and the fourth octave is filtered using a 17 tap FIR filter and the fifth octave is filtered using a 33 tap FIR filter and all higher octaves are filtered using a 33 tap FIR filter, as described in applicant's copending application No. 08/124,201, filed on Sep. 21, 1993 entitled Digital Filter with Improved Numerical Precision.

TABLE 2

|  | 6 bit Coefficients | 4 bit Coefficients | Shift |
|---|---|---|---|
| 3-Tap Filter Half Band Filter | | | |
| h(0) | 100000 | 1000 | 1R |
| h(1), h(−1) | 010000 | 0100 | 1R |
| 5-tap Quarter Band Filter | | | |
| h(0) | 010010 | 1001 | 2R |
| h(1), h(−1) | 001110 | 1110 | 3R |
| h(2), h(−2) | 001001 | 1001 | 3R |
| 9-tap 1/8 Band Filter | | | |
| h(0) | 001010 | 1010 | 3R |
| h(1), h(−1) | 001001 | 1001 | 3R |
| h(2), h(−2) | 001000 | 1000 | 3R |
| h(3), h(−3) | 000110 | 0110 | 3R |
| h(4), h(−4) | 000100 | 0100 | 3R |
| 17-tap 1/16 Band Filter | | | |
| h(0) | 000110 | 0110 | 3R |
| h(1), h(−1) | 000101 | 0101 | 3R |
| h(2), h(−2) | 000100 | 0100 | 3R |
| h(3), h(−3) | 000100 | 0100 | 3R |
| h(4), h(−4) | 000100 | 0100 | 3R |
| h(5), h(−5) | 000100 | 0100 | 3R |
| h(6), h(−6) | 000011 | 0011 | 3R |
| h(7), h(−7) | 000011 | 0011 | 3R |
| h(8), h(−8) | 000010 | 0010 | 3R |
| 33-tap 1/32 Band Filter | | | |
| h(0) | 000100 | 0100 | 3R |
| h(1), h(−1) | 000011 | 0011 | 3R |
| h(2), h(−2) | 000011 | 0011 | 3R |
| h(3), h(−3) | 000010 | 0010 | 3R |
| h(4), h(−4) | 000010 | 0010 | 3R |
| h(5), h(−5) | 000010 | 0010 | 3R |
| h(6), h(−6) | 000010 | 0010 | 3R |
| h(7), h(−7) | 000010 | 0010 | 3R |
| h(8), h(−8) | 000010 | 0010 | 3R |
| h(9), h(−9) | 000010 | 0010 | 3R |
| h(10), h(−10) | 000010 | 0010 | 3R |
| h(11), h(−11) | 000010 | 0010 | 3R |
| h(12), h(−12) | 000010 | 0010 | 3R |

TABLE 2-continued

|  | 6 bit Coefficients | 4 bit Coefficients | Shift |
|---|---|---|---|
| h(13), h(−13) | 000010 | 0010 | 3R |
| h(14), h(−14) | 000010 | 0001 | 3R |
| h(15), h(−15) | 000001 | 0001 | 3R |
| h(16), h(−16) | 000001 | 0001 | 3R |

It will be noted that the filter coefficients are all positive. In this particular case the input to the multipliers that selects between 2's complement and normal operation is unused. The multipliers are still required to operate on 2's complement data and unsigned filter coefficients. The filter coefficients are still shifted and sign extended as in the case in which both signed and unsigned filter coefficients are used.

The filter coefficients are the same for both vertical and horizontal directions. The method described in Applicant's corresponding application no. 08/133,367, entitled Image Filtering With an Efficient Implementation of High Order Decimating Digital Filters, has been employed to extend the use of the 33 tap filter for resize factors above the fifth octave. This technique has been applied both horizontally and vertically.

A more detailed discussion of the circuit of FIG. 4 will now be presented.

Input line 71 carries video signal sample values from successive input lines L1, L2 ... L6, L7 ... etc. which form the relatively long scan-line sampling periods in the vertical direction of a video image. Thus, L1, L2 ... L7 and L8 represent eight successive relatively long horizontal scan lines of the video image (with each scan line comprising a large number of pixel sample values). Thus, starting with input line L1, multiplier 77 receives, in turn, as a multiplicand each of all the successive input lines L1, L2 ... L6, L7 ... of sample values, and receives as a multiplier one of the truncated 4-bit filter coefficients h(−1) or h(0) from ROM 75 (see Table 2 of the truncated kernel function coefficients). Starting with input line L3, multiplier 79 receives, in turn, as a multiplicand each of the successive odd input lines L3, L5, L7, L9 ... of sample values, and receives as a multiplier the truncated 4-bit filter coefficient h(1) from ROM 78. In general, each of the successive input lines L1 ... L9 ... comprises N sample values, where N may be any positive integer. However, for illustrative purposes, it is assumed that each of these successive input lines is a scan line of a video image, occupying a scan-line period, and N is the number of pixel sample values in such a scan line.

As discussed above with reference to Table 2, the 12 bit output of multiplier 77 is shifted and sign extended to restore significance to the intermediate product integers output for multiplier 77 via shift and sign extend circuit 81.

The output of shift and sign extend circuit 81 is applied as a first input to summer 85 and the output of summer 85 is applied as an input to N-sample delay circuit 89. The output of the N-sample delay circuit 89 is applied both as a first input to multiplexer 87 and as a first input to multiplexer 91. A zero value is applied as a second input to both multiplexers 87 and 91. The output of multiplexer 87 is applied as a second input to summer 85 and the output of multiplexer 91 is applied as a first input to summer 93. The output from multiplier 79 is shift and sign extended via circuit 83 as discussed above, and the output of the shift and sign extend circuit 83 is applied as a second input to summer 93. The output from summer 93 comprises the octave prefilter decimated output signal.

In addition to the structure shown in FIG. 4, each multiplier and summer includes an individual sample latch (not shown) at each of its inputs and at its outputs, with each latch introducing a one sample delay in the flow of data. Further, in practice, suitable timing and control circuitry (not shown) is provided for controlling the flow of data through the octave prefilter structure of FIG. 4.

The setting of multiplexer 87 is such that the output of N-sample delay circuit 89 is recirculated only during even input-line scan-line period cycles of operation and zero values are normally recirculated during all odd input-line scan-line period cycles of operation. (Although in principle, it is not absolutely essential that multiplexer 87 be in its zero value stage during those odd input-line scan-line period cycles of operation, such as during the initial cycle, where it is known a priori that no sample values can be emerging from the output of N-sample delay circuit 89). The setting of multiplexer 91 is such that the output of N-sample delay circuit 89 is translated therethrough to the input of summer 93 only during odd input-line scan-line period cycles of operation and zero values are translated therethrough to the first input of summer 93 during even input-line scan-line period cycles of operation.

For the purpose of the following discussion, corresponding sample values of the respective input lines L1, L2, L3 . . . are designated sL1, sL2, sL3 . . . , respectively. During the first scan-line period cycle of operation of the filter, each of the N samples of input line L1 is first multiplied by coefficient h(−1), to provide a sample value h(−1)s L1 and then each of these sample values is shifted and sign extended via circuit 81 to restore significance to the product signal and then applied through summer 85 as an input to the N-sample delay means 89.

During the second scan-line period cycle of operation, multiplexer 87 is in its non-zero state, so that the sample values h(−1) sL1 now emerging as an output from the N-sample delay circuit 89 are recirculated back as a second input to summer 85 and are added to the corresponding h(0) sL2 samples now being applied as a first input to summer 85 (ie ROM 75 generates the appropriate truncated 4-bit kernel-function weighting coefficient which is multiplied by the N samples of the second input line L2 in multiplier 77 and shifted and sign extended via circuit 81). Therefore, during the second scanline period cycle of operation, the sample value of each sample applied as an input to the N-sample delay circuit 89 is h(−1) sL1+h(0) sL2. However, during the second scan-line period cycle of operation, multiplexer 91 is in its zero state, so that the h(−1) sL1 value output from delay circuit 89 is not applied to the first input of summer 93.

During the third scan-line period cycle of operation, multiplexer 87 is in its zero state, so that no recirculation takes place of the h(−1) sL1+h(0) sL2 valued samples output from the N-sample delay circuit 89 to the summer 85. However, multiplexer 91 is now in its non-zero state, so that the h(−1) sL1+h(0) sL2 valued samples output from delay circuit 89 are forwarded through multiplexer 91 to the first input of summer 93. Thus, during the third scan-line period cycle of operation, h(−1) sL1+h(0) sL2+h(1) sL3 valued samples are output from the filter (ie. ROM 78 generates the appropriate truncated 4-bit kernel-function weighting coefficient which is multiplied by the N samples of the third input line L3 in multiplier 79 and shifted and sign extended via circuit 83).

During the fourth scan-line period cycle of operation, ROM 75 generates the 4-bit truncated kernel function weighting coefficient h(0) for multiplication by the N-samples of input line L4 via multiplier 77. The intermediate product signal output from multiplier 77 is shifted and sign extended via circuit 81 and applied to summer 85 so that the output of summer 85 is input to N-sample delay 89 since the multiplexer 87 is in its non-zero state.

During the fifth scan-line period cycle of operation, multiplexer 87 is in its zero state, so that no recirculation takes place of the h(−1) sL3+h(0) sL4 valued samples now emerging as an output from N-sample delay circuit 89 back as a second input to summer 85. However, now multiplexer 91 is in the non-zero state, so that the h(−1) sL3+h(0) sL4 valued samples are forwarded through multiplexer 91 to the first input of summer 93. Also, the ROM 78 generates the 4-bit truncated kernel function weighting coefficient h(1) for multiplications by the N-samples of input line L5 via multiplier 79. The intermediate product signal output from multiplier 79 is shifted and sign extended via circuit 83 and applied to summer 93. Thus, during the fifth scan-line period cycle of operation, h(−1) sL3+h(0) sL4+h(1) sL5 valued samples are output from the filter.

It will be noted that the status of the h(−1) sL3+h(0) sL4 valued samples during the fifth scan-line period cycle of operation is identical to the status of the h(−1) sL1+h(0) sL2 valued samples during the third scan-line period cycle of operation. Thus, the sixth and seventh scan-line period cycles of operation will correspond, respectively, to the fourth and fifth scan-line period cycles of operation.

Therefore, the second filtered output line, comprising h(−1) sL3+h(0) sL4+h(1) sL5 valued samples, will be derived in the fifth scan-line period cycle of operation. In a similar manner, the third filtered output line comprising h(−1) sL5+h(0) sL6+h(1) sL7 valued samples,, will be derived in the seventh scan-line period cycle of operation while the fourth filtered output line, comprising h(−1) sL7+h(0) sL8+h(1) sL9 valued samples, will be derived in the ninth scan-line period cycle of operation, and so forth.

From the above discussion, it can be seen that filtered output lines occur only for each successive odd scan-line period cycle of operation, starting with the third scan-line period cycle of operation. Therefore, decimation by a factor of two has taken place between the input and output lines of the first 3-tap octave prefilter structure of the present invention shown in FIG. 4.

The structure of FIG. 4 may be used to implement a 5 tap, 9 tap, 17 tap, and 33 tap structure by applying the appropriate truncated kernel-function weighting coefficients from ROMs 75 and 78 to multipliers 77 and 79 in accordance with the appropriate timing control. The truncated intermediate product signals output from multipliers 77 and 79 are shifted and sign extended via circuits 81 and 83 in the manner discussed above.

Other embodiments and variations are Possible without departing from the sphere and scope of the invention as defined by the claims appended hereto.

We claim:

1. Apparatus for resizing an image, comprising:

a) interpolation filter means for receiving a stream of input pixels having a predetermined sampling period P and a first sampling rate of S pixels/lines, and interpolating said stream of input pixels at a predetermined interpolation rate for generating a first derived sample stream of pixels having a further sampling period (M/(CL))P and a second sampling rate of T pixels/lines, where L is a first positive integer greater than one, C is a positive integer and M is smaller than CL, and where either $2^n M/CL$ or $2^{-n}M/CL$ is equal to time step increment M/L and the absolute value of n is at least equal to zero;

b) octave filtering means having a predetermined sampling rate which is related to the interpolation rate of said interpolation filter, for receiving said first derived sample stream of pixels and in response generating a stream of filtered output pixels having a sample period of (M/L)P;

c) means for decrementing said first rate S by one and in response outputting a decremented first rate S−1;

d) means for decrementing said second rate T by one and in response outputting a decremented second rate [S−1] T−1;

e) means for dividing said decremented first rate S−1 by said decremented second rate T−1 and in response outputting said time step increment M/L; and f) resampling said input pixels at said step increment M/L, thereby producing said resampled pixels at said second rate of T, with alignment of said input pixels and said resampled pixels at said boundaries of said image.

2. The apparatus of claim 1, further comprising means for multiplying said decremented second rate T−1 by 2D in the event said resampled pixels are to be subjected to multirate processing via a digital filter, where D represents a normalizing parameter based on the order of said digital filter.

3. Apparatus for resizing an image, comprising:

a) interpolation filter means for receiving a stream of input pixels having a predetermined sampling period P and a first sampling rate of S pixels/lines, and interpolating said stream of input pixels at a predetermined interpolation rate for generating a first derived sample stream of pixels having a further sampling period (M/(CL))P and a second sampling rate of T pixels/lines, where L is a first positive integer greater than one, C is a positive integer and M is smaller than CL, and where either $2^n$M/CL or $2^{-n}$M/CL is equal to time step increment M/L and the absolute value of n is at least equal to zero;

b) octave filtering means having a predetermined sampling rate which is related to the interpolation rate, of said interpolation filter, for receiving said first derived sample stream of pixels and in response generating a stream of filtered output pixels having a sample period of (M/L)P, wherein said octave filtering means is characterized by a plurality of filter coefficients, positive ones of said coefficients being represented by unsigned binary integers and negative ones of said coefficients being represented by 2's complement binary integers, said octave filtering means further including i) an input for receiving said first derived sample stream of pixels each comprising a first predetermined number of bits;

ii) means for truncating or rounding at least one leading "0" or trailing "0" of said positive ones of said coefficients and at least one leading "1" or trailing "0" of said negative ones of said coefficients, such that significance of said integers is removed;

iii) means for multiplying said first derived sample stream of pixels by respective ones of said truncated representations of said respective ones of said plurality of filter coefficients and in response generating a plurality of intermediate product integers;

iv) means for sign extending and shifting said intermediate product integers to restore significance thereto;

v) means for summing said intermediate product integers and in response generating said stream of filtered output pixels; and c) means within said interpolation filter means for aligning said stream of input pixels and said first derived stream of sampled pixels at the boundaries of said image.

4. The apparatus of claim 3, wherein said means for truncating or rounding comprises a digital memory for storing said coefficients encoded in truncated form.

5. The apparatus of claim 3, wherein said means for multiplying further comprises a plurality of digital multipliers.

6. The apparatus of claim 3, wherein said means for restoring significance comprises means for sign extending and shifting said intermediate product integers rightward.

7. The apparatus of claim 4, wherein said digital memory stores three 6-bit truncated coefficients for implementing a 5-tap decimating half band filter, as follows: h(0)=101000; h(1), h(−1)=010000 and h(2), h(−2)=111100, and wherein said means for restoring significance comprises means for sign extending and shifting said intermediate product integers 1 bit rightward.

8. The apparatus of claim 4, wherein said digital memory stores a first truncated 6-bit filter coefficient and further truncated 6-bit filter coefficients for implementing a 9-tap decimating quarter band filter, wherein said first truncated filter coefficient comprises h(0)=100111, and said further truncated filter coefficients comprise h(1), h(−1)=111111; h(2), h(−2)=011110; h(3), h(−3)=000011 and h(4), h(−4)= 111001, and wherein said means for restoring significance to said intermediate product integers in respect of a first one of said intermediate product integers comprises means for sign extending and shifting said first intermediate product integer 2 bits rightward, and wherein said means for restoring significance to additional ones of said intermediate product integers comprises means for sign extending and shifting said additional intermediate product integers three bits rightward.

9. The apparatus of claim 4, wherein said means for restoring significance comprises means for sign extending and shifting said intermediate product integers 3 bits rightward, and wherein said coefficients are encoded in truncated form within said digital memory for effecting a 17-tap decimating ⅛th band filter as follows:

h(0)=100110 h(1), h(−1)=100101 h(2), h(−2)=011111 h(3), h(−3)=010111 h(4), h(−4)=001111 h(5), h(−5)=000111 h(6), h(−6)=000001 h(7), h(−7)=111110 h(8), h(−8)=111101

10. The apparatus of claim 4, wherein said means for restoring significance comprises means for sign extending and shifting said intermediate product integers 3 bits rightward, and wherein said coefficients are encoded in truncated form within said digital memory for effecting a 65-tap decimating 1/32nd band filter as follows:

h(0)=001010 h(1), h(−1)=010000 h(2), h(−2)=001001 h(3), h(−3)=001001 h(4), h(−4)=001000 h(5), h(−5)=001000 h(6), h(−6)=001000 h(7), h(−7)=001000 h(8), h(−8)=000111 h(9), h(−9)=000111
h(10), h(−10)=000110
h(11), h(−11)=000110
h(12), h(−12)=000101
h(13), h(−13)=000101
h(14), h(−14)=000100
h(15), h(−15)=000100
h(16), h(−16)=000011
h(17), h(−17)=000011
h(18), h(−18)=000010
h(19), h(−19)=000010
h(20), h(−20)=000001
h(21), h(−21)=000001
h(22), h(−22)=000001
h(23), h(−23)=000000
h(24), h(−24)=000000
h(25), h(−25)=000000
h(26), h(−26)=000000
h(27), h(−27)=000000
h(28), h(−28)=000000
h(29), h(−29)=000000
h(30), h(−30)=000000
h(31), h(−31)=000000
h(32), h(−32)=000000

11. The apparatus of claim 4, wherein said digital memory stores two 4-bit truncated coefficients for implementing a 3-tap decimating half band filter, as follows: h(0)=1000; h(1), h(−1)=0100, and wherein said means for restoring significance comprises means for sign extending and shifting said intermediate product integers 1 bit rightward.

12. The apparatus of claim 4, wherein said digital memory stores a first truncated 4-bit filter coefficient and further truncated 4-bit filter coefficients for implementing a 5-tap decimating quarter band filter, wherein said first truncated filter coefficient comprises h(0)=1001, and said further truncated filter coefficients comprise h(1), h(−1)=1110 and h(2), h(−2)=0111, and wherein said means for restoring significance to said intermediate product integers in respect of a first one of said intermediate product integers comprises means for sign extending and shifting said first intermediate product integer 2 bits rightward, and wherein said means for restoring significance to additional ones of said intermediate product integers comprises means for sign extending and shifting said additional intermediate product integers three bits rightward.

13. The apparatus of claim 4, wherein said means for restoring significance comprises means for sign extending and shifting said intermediate product integers 3 bits rightward, and wherein said coefficients are encoded in truncated form within said digital memory for effecting a 9-tap decimating ⅛th band filter as follows:

h(O)=1010
h(1), h(−1)=1001
h(2), h(−2)=0100
h(3), h(−3)=0110
h(4), h(−4)=0100

14. The apparatus of claim 4, wherein said means for restoring significance comprises means for sign extending and shifting said intermediate product integers 3 bits rightward, and wherein said coefficients are encoded in truncated form within said digital memory for effecting a 17-tap decimating ¹⁄₁₆th band filter as follows:

h(O)=0110
h(1), h(−1)=0101
h(2), h(−2)=0100
h(3), h(−3)=0100
h(4), h(−4)=0100
h(5), h(−5)=0100
h(6), h(−6)=0011
h(7), h(−7)=0011
h(8), h(−8)=0010

15. The improvement of claim 4, wherein said means for restoring significance comprises means for sign extending and shifting said intermediate product integers 3 bits rightward, and wherein said coefficients are encoded in truncated form within said digital memory for effecting a 33-tap decimating ¹⁄₁₆th band filter as follows:

h(O)=010010
h(1), h(−1)=011000
h(2), h(−2)=010001
h(3), h(−3)=010000
h(4), h(−4)=001111
h(5), h(−5)=001101
h(6), h(−6)=001011
h(7), h(−7)=001001
h(8), h(−8)=000111
h(9), h(−9)=000101
h(10) h(−10)=000011
h(11) h(−11)=000010
h(12) h(−12)=000000
h(13) h(−13)=000000
h(14) h(−14)=111111
h(15) h(−15)=111111
h(16) h(−16)=111111

16. The improvement of claim 4, wherein said means for restoring significance comprises means for sign extending and shifting said intermediate product integers 3 bits rightward, and wherein said coefficients are encoded in truncated form within said digital memory for effecting a 33-tap decimating ¹⁄₁₆th band filter as follows:

h(0)=0100
h(1), h(−1)=0011
h(2), h(−2)=0011
h(3), h(−3)=0010
h(4), h(−4)=0010
h(5), h(−5)=0010
h(6), h(−6)=0010
h(7), h(−7)=0010
h(8), h(−8)=0010
h(9), h(−9)=0010
h(10) h(−10)=0010
h(11) h(−11)=0010
h(12) h(−12)=0010
h(13) h(−13)=0010
h(14) h(−14)=0001
h(15) h(−15)=0001
h(16) h(−16)=0001

* * * * *